(12) United States Patent
Draxö et al.

(10) Patent No.: US 6,337,104 B1
(45) Date of Patent: Jan. 8, 2002

(54) PRE-GLUED GLASS FABRIC WALLCOVERING

(75) Inventors: Krister Draxö, Helsingborg; Thure Svensson, Ödåkra, both of (SE)

(73) Assignee: Johns Manville Europe GmbH, Frankfurt (DE)

(*) Notice: Subject to any disclaimer, the term of this patent is extended or adjusted under 35 U.S.C. 154(b) by 0 days.

(21) Appl. No.: 09/588,600

(22) Filed: Jun. 7, 2000

(51) Int. Cl.⁷ .................................................. B05D 1/38
(52) U.S. Cl. .................. 427/207.1; 427/208.4; 427/208.8; 427/407.3
(58) Field of Search ............ 427/207.1, 208.4, 427/208.8, 407.3

(56) References Cited

U.S. PATENT DOCUMENTS

| | | |
|---|---|---|
| 4,112,174 A | 9/1978 | Hannes et al. |
| 4,681,802 A | 7/1987 | Gaa et al. |
| 4,810,576 A | 3/1989 | Gaa et al. |

FOREIGN PATENT DOCUMENTS

| | | | |
|---|---|---|---|
| DE | 103018 A | * | 1/1974 |
| DE | 154939 A | * | 5/1982 |
| DE | 19811152 | | 9/1999 |
| EP | 0909850 | | 10/1998 |
| JP | 08-035180 A2 | * | 2/1996 |
| WO | 9814655 | | 4/1998 |

OTHER PUBLICATIONS

Kirk–Othmer Encyclopedia of Chemical Technology, Fourth Edition, 22:712, 1997.*

* cited by examiner

Primary Examiner—Erma Cameron
(74) Attorney, Agent, or Firm—Burns, Doane, Swecker & Mathis, L.L.P.

(57) ABSTRACT

An improved pre-glued glass fiber wallcovering and process for its formation are provided. Initially, both sides of a glass fabric are coated with a first coating applied from an aqueous dispersion of a starch binder and a polymeric latex binder. In a preferred embodiment a cross-linking agent and pigment also are present in the first aqueous dispersion. Following the drying of such dispersion to form a first coating on both surfaces, a second dried coating is provided on one side only. The second coating is applied from an aqueous dispersion of starch in the absence of a polymeric latex binder. Such second coating also is dried and is capable of serving as an adhesive for the attachment of the resulting wallcovering to the wall when wetted (e.g., by spraying with water). Once applied to the wall the wallcovering requires only one coat of paint.

23 Claims, 1 Drawing Sheet

PRE-GLUED GLASS FABRIC WALLCOVERING

BACKGROUND OF THE INVENTION

The benefits of using fabric glass wallcoverings are well known. Fiberglass wallcoverings offer fire resistance, easy and uncomplicated handling, and flexibility in use. They also exhibit good abrasion resistance and good appearance following painting. On the other hand fiberglass wallcoverings of the prior art require the use of special glues or adhesives with strong binding forces and require cost-intensive and time consuming painting procedures.

Typically, when covering a wall with a glass fabric, the wall as well as the fabric must be treated with a special glue or adhesive. The commonly used wet adhesive is primarily based on a starch-solution and always contains some latex binder, and must be rolled onto or sprayed onto the wall and onto the fabric. After drying, the wallcovering must be painted twice. Between the first and the second painting step the wall and the wallcovering must be dried. The paints most commonly used are standard interior wall paints, i.e., various types of latex paints.

In order to enable easy handling and the use of such wallcoverings, the woven glass fabric often is impregnated with a water-based formulation which contains mainly starch, binder and an inorganic cross-linker. The finished wall-covering typically contains up to 25 weight percent of such chemicals.

In the past, many attempts have been made to avoid the disadvantages of standard adhesives used with glass fabrics and to reduce the complexity and the time consuming procedures encountered by the end-user. WO98 14 655 describes glass fiber wallcoverings which employ a thermoplastic adhesive. Thermoplastic adhesives require a special temperature treatment which necessitates even additional equipment. The process by necessity is complicated and time consuming.

The necessary high temperature treatment can be avoided when using a self-adhesive layers as the backing layer. DE 198 11 152 describes a painted or printed glass wallcoverings with a self-sticking backing. Such systems, however, cannot be removed from the wall without the use of chemicals.

EP 0 909 850 describes a finished wallcovering with a multicolor print and a self-adhesive backing. However, self-adhesive wallcoverings are relatively expensive because they require additional production steps, e.g., the covering of the adhesive layer prior to use. In addition, the handling of such wallcoverings when applied to the wall is completely different than standard application procedures.

All such non-standard systems, mentioned above, require special materials and equipment. The handling differs significantly from standard well-known papering procedures. For paper wallcoverings a starch-based adhesive in the absence of a latex binder is most commonly used. Such starch-based adhesive can be dried and re-wetted again without a significant change in the gluing capability. The handling is easy and a special treatment in addition to rolling or spraying the paper and the wall with a paper glue is not necessary.

It is much desired in the art to provide an improved glass fabric wallcovering that keeps the good aspects of glass fabric wallcoverings, i.e., fire resistance, easy handling, flexibility, good appearance and good abrasion resistance, and which can be applied to the wall using less complicated and time consuming procedures.

SUMMARY OF THE INVENTION

It is an object of the present invention to provide a pre-glued fiberglass wallcovering which can be handled more easily when covering a wall, and which reduces the necessary processing steps for the end-user. The glass fabric has the same properties as standard fiberglass wallcoverings, in particular, excellent fire resistance.

It is another object of the present invention to provide a process for the manufacture of an improved pre-glued glass fabric wallcovering.

According to a preferred embodiment of the present invention, a wallcovering is produced by a process comprising the steps of providing a glass fabric, applying a first aqueous dispersion onto both sides of the glass fabric and forming dried coatings on both sides, and applying a second aqueous dispersion on the back side only of the fabric to create a thin dried layer which acts as the adhesive layer when the wallcovering is wetted for attachment to the wall.

While the preferred embodiment of the present invention utilizes glass fabrics in woven and rolled form, other fiberglass fabrics such as a nonwoven mats may be utilized.

Other objects and advantages of the present invention will become apparent to those skilled in the art from the following detailed description of the preferred embodiments, together with the accompanying drawings.

DETAILED DESCRIPTION OF THE INVENTION

Figure 1:
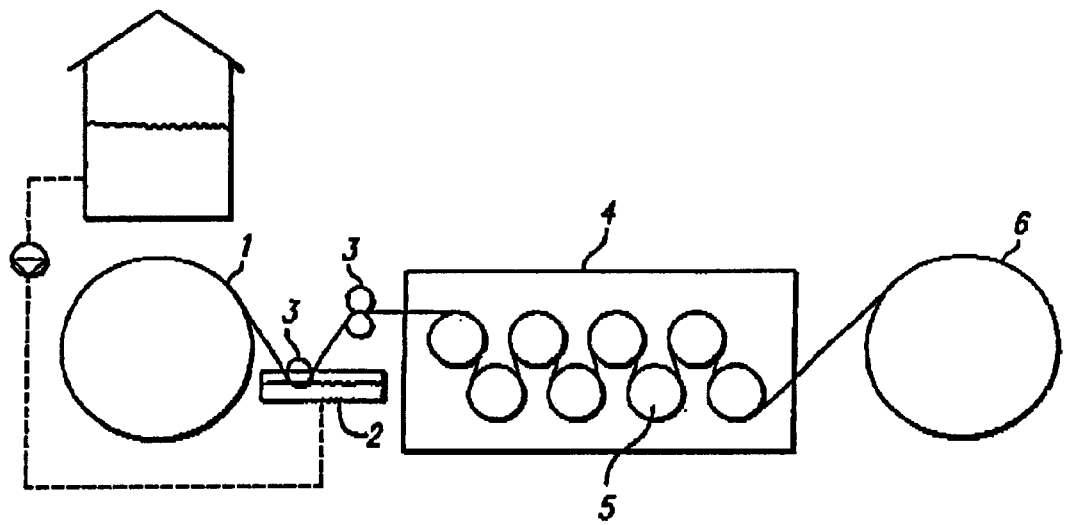
FIG. 1 depicts a preferred apparatus arrangement for applying the first dried coating on a continuous basis to both sides of the glass fabric in accordance with the process of the present invention.

FIG. 1 depicts a process for applying a customary coating to a glass fabric from an aqueous dispersion. Preferably the glass fabric is a woven product that incorporates fiberglass yarn. The weave is typically a simple weave pattern of up to eight shafts. The weave can be produced, for example, on Dornier weaving machines, Rapiers or Air-Jets, in typically two or three meter widths for collecting on roll beams of typically 1,500 to 6,000 meters in length of untreated woven fiberglass fabric. Many fiberglass yarns may be selected for use when producing the woven materials for use in the present invention. Preferred yarns include, for the warp direction are continuous C-glass or E-glass of 9 to 10 microns, and 139 to 142 tex with approximately 315 to 340 ends per meter. An alternative warp yarn is formed from continuous C-glass or E-glass of 6 to 9 microns, 34 to 68 tex with approximately 680 ends per meter. For the weft direction, a preferred glass is discontinuous spun E-glass or C-glass, 8 to 11 microns, and 165 to 550 tex with approximately 170 to 600 ends per meter. An alternative weft yarn includes continuous volumized E-glass or C-glass of 8 to 11 microns and 165 to 550 tex with approximately 170 to 600 ends per meter.

The present invention is also applicable to nonwoven glass fabrics, such as mat products. These can be produced, for example, by conventional wet-laid processes such as those described in U.S. Pat. Nos. 4,112,174; 4,681,802 and 4,810,576, the disclosures of which are incorporated herein by reference.

In the process of the present invention, the glass fabric 1, preferably provided in roll form, is fed to a first impregnation bath 2, typically with the aid of through rollers 3 and conventional conveyance means so as to contact on both surfaces a bath of the chemical dispersion. Alternatively, for example, a transfer roll may convey the first chemical dispersion to at least one of the glass fabric surfaces. A preferred first chemical dispersion includes the components identified in Table 1 below where concentrations are provided on a weight basis.

Alternatively to the use of rollers 3, double-sided rotary screens may be used to apply the chemicals to the glass fabric 1. The chemical dispersion is then supplied to the interior of the two rotating screens and is applied to the glass fabric by contact with the rotating screens.

TABLE 1

| | |
|---|---|
| Starch binder | 10 to 70% of dry substance |
| Polymeric latex binder | 20 to 80% of dry substance |
| Cross-linker | 0 to 15% of dry substance |
| Pigment | 10 to 30% of dry substance |

Commercially available starch binders or CMCs (carboxy-methyl cellulose) can be used. Starch binders derived from potatoes are preferred, but also corn can be used as a starch source. The polymeric latex binders are preferably copolymers of vinyl acetate and acrylics, e.g., ethylvinyl acetate and styrene acrylics. However, polyvinyl acetate (PVAc) or other polymeric latex binders can also be used.

Cross-linkers are agents that are reactive towards certain functional groups located primarily on the polymeric latex binder. Cross-linkers preferably are used in a concentration of 3 to 12 percent on a dry basis to improve important characteristics such as film formation, hydrophobicity, wet strength, etc. These reactive agents can be either organic or inorganic types, e.g., be based on zirconium, urea/formaldehyde or glyoxal derivatives. Zirconium cross-linking agents are preferred.

The preferred formulation is the most cost effective and technically functional.

The mixture is preferably water based, and has a dry substance percentage of between 5 and 20 weight percent, preferably between 10 and 12 weight percent in the chemical dispersion. Besides white pigments colored pigments can also be added or used to create colored fabrics as well.

Following the impregnation, the fabric may be conveyed to a drying oven 4, which in the preferred embodiment of FIG. 1 utilizes steam heated cylinders 5. After drying the fabric can be cut into desired width, and collected for the subsequent secondary treatment. A fabric length of approximately 1,000 to 6,000 meters of treated fabric can be collected at batching stand 6. Alternatively, the subsequent application step wherein the second coating is applied can be carried out on a continuous basis.

This first impregnation step adds additional volume and opacity to the glass fabric. This leads to a pre-painted fabric which requires only a single painting step by the end-user. The time consuming second painting which is customarily necessary for glass fabrics can be omitted.

Figure 2:
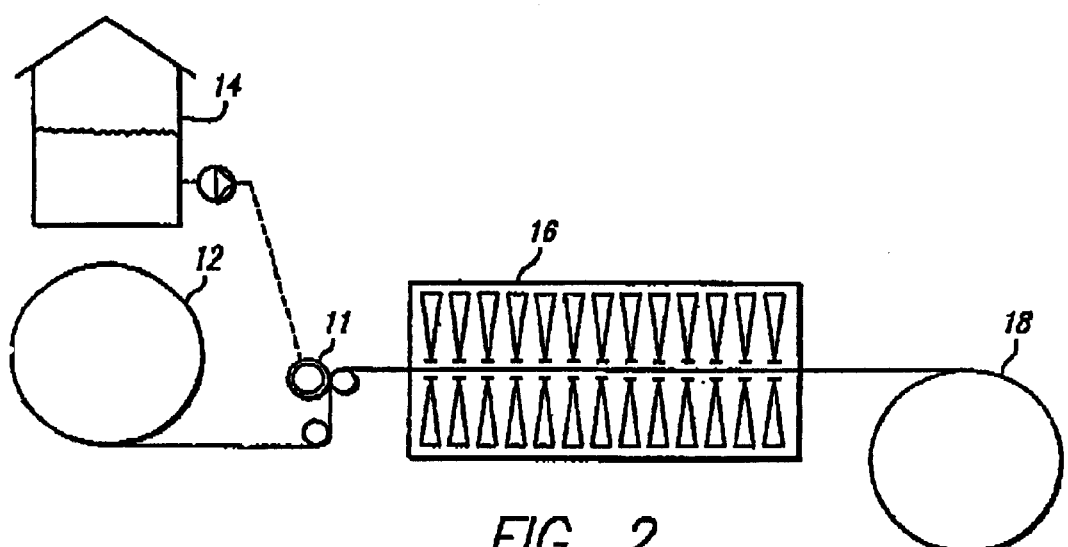
FIG. 2 depicts a preferred apparatus arrangement for applying the second dried coating on a continuous basis to one side only of the glass fabric in accordance with the process of the present invention.

After the application of the chemical dispersion of Table 1, the second chemical treatment follows. In FIG. 2, a preferred method of applying the second gluing layer to one side only of the fabric is shown. Such application to one side only is on top of the previously applied first dried coating.

A rotating screen 11, such as available from Stork, may be used to next apply the second chemical dispersion to the glass fabric 12. The chemical dispersion 14 is supplied to the interior of the rotating screen 11. The dispersion is applied to the glass fabric by contact with the rotating screen. The chemical dispersion also can be applied by a transfer roller.

A preferred chemical dispersion for the second coating consists of the components set out in Table 2 below.

TABLE 2

| | |
|---|---|
| Starch | 50 to 100% of dry substance |
| Inorganic compounds | 0 to 20% of dry substance |
| Color additives | 0 to 5% of dry substance |

The starch component that is present may be derived from any source that gives a good tack in gelatinized wetted form. For instance, potato, corn, wheat starches or the combinations thereof may be utilized. A combination potato starch and corn starch is most preferred.

Inorganic compounds (e.g., in a concentration of 5 to 15% of dry substance) may be added to improve the functionality and appearance of the chemical treatment and the resulting product, e.g., opacity and water absorbability. An example of a compound to improve the latter is sodium nitrate, or other hygroscopic compounds. Opacity can be obtained from a variety of fillers and pigments, preferably based on titanium dioxide, aluminum hydroxide, calcium carbonate, and other inorganic salts.

Typically, 25 to 50 g of the adhesive of Table 2 per square meter is sufficient to obtain an optimum adhesion strength. The amount of adhesive depends to some degree on the type and texture of the glass fabrics that are selected. Good adhesion strength is necessary to obtain the same wear resistance and the same fire resistance as standard glass fiber wallcovering.

Following the second application of the chemical dispersion to the glass fabric surface, the glass fabric may be conveyed to a drying means, which in the preferred embodiment of FIG. 2 is air dryer 16. Alternatively, heated cylinders can be used. After drying, the fabric is commonly cut into desired width, and is collected for subsequent secondary treatment, for example, into rolls at a batching stand 18 of between 1,000 and 6,000 meters of treated weave.

This second chemical treatment is a one-side coating of the dried gluing material which is placed on top of the first coating. It leads to an adhesive layer which faces the wall. A colored additive can enable the end-user to distinguish between the front side and the pre-glued back side of the wallcovering.

The second adhesive coating does not contain any polymeric latex components. In a preferred embodiment it is formulated from two different starches types, originating from different crops. The usage of these two starches allows the combination of an excellent tack with a very good film formation. Using this formulation the resulting adhesive force between the wall and the wallcovering is superior to that of the normal wallcovering system. This renders redundant the use of a standard polymeric latex binder.

For the product of the present invention to work satisfactorily it is important that the starch formulation mentioned in the paragraph above quickly absorbs water applied on the surface. In order to achieve this a small additional quantity of inorganic compound is recommended. The functioning of this compound results in a pre-activating of the starch formulation, i.e., making the starch more quickly accessible to the water.

The product of the novel process described above is typically supplied to an end user in roll form having a length of approximately 50 meters for application to a wall or other interior structure. After cutting the layers to the desired length only water is sprayed or otherwise applied onto the pre-glued fiberglass wallcovering of the present invention. Dipping the fabric into a water bath is not necessary and is not recommended. When exposed to water the adhesive layer swells rapidly and becomes sticky and tacky. Only water is needed when attaching the fabric to the wall which offers a significant advantage to the end-user. The wetted fabric can be attached to the wall within minutes and the opposite surface can be painted immediately afterwards. A separate drying step is not necessary. All types of paints (i.e., latex paints) which can be used for standard fiberglass wallcoverings can be applied to the novel product. Only one painting step is necessary to achieve the desired result leading to significant time and cost savings. The product has the same fire resistance rating as standard fiber glass weaves and exhibits a superior adhesion to the wall.

EXAMPLE

A glass woven fabric consisting of 139 tex texturized continuous glass warp yarns with 315 yarns per meter and 250 tex texturized glass staple fiber yarns with 200 yarns per meter is produced and is coated and impregnated on both sides with an aqueous chemical dispersion comprising 25 percent of a potato starch, 47 percent acrylic latex binder, 6 percent of zirconium cross-linker, and 22 percent of a white titanium oxide pigment on a dry basis. After drying to form a first dried coating a second chemical dispersion is applied on one side only using a rotary screen applicator. The second dispersion contains 60 percent potato starch, 30 percent corn starch, 7 percent of sodium nitrate, and 3 percent of a colorant on a dry basis. The second chemical dispersion next is dried to form a second coating that is capable of serving as an adhesive for the attachment of the resulting wall covering following the simple application of water by spraying to the second dried coating. All concentrations are expressed on a dry weight basis.

Although the invention has been described with a preferred embodiment, it is to be understood that variations and modifications may be resorted to as will be apparent to those skilled in the art. Such variations and modifications are to be considered within the purview and scope of the claims appended hereto.

We claim:

1. A process for forming a pre-glued glass fabric wallcovering comprising:
   (a) providing a glass fabric,
   (b) forming first dried coatings on both sides of said glass fabric that are applied from an aqueous dispersion comprising starch, a polymeric latex binder, and cross-linking agent, and
   (c) next forming a second dried coating on said first dried coating on one side only of said glass fabric that is applied from an aqueous dispersion comprising starch in the absence of a polymeric latex binder with said second dried coating serving as an adhesive for the attachment to a wall following application of water.

2. A process according to claim 1 wherein said glass fabric is a woven fabric.

3. A process according to claim 1 wherein the glass fabric is nonwoven fabric.

4. A process according to claim 1 wherein said starch component of (b) is potato starch.

5. A process according to claim 1 wherein the polymeric latex binder component of (b) is an acrylic latex binder.

6. A process according to claim 1 wherein said cross-linking agent of (b) is a zirconium cross-linker.

7. A process according to claim 1 wherein said aqueous dispersion of (b) additionally includes a pigment.

8. A process according to claim 7 wherein said pigment of (b) is titanium dioxide.

9. A process according to claim 1 wherein said starch component of (c) is a mixture of potato starch and corn starch.

10. A process according to claim 1 wherein said aqueous dispersion of (c) includes an inorganic compound that serves to enhance the water absorbability of said second dried coating.

11. A process according to claim 10 wherein said inorganic compound is sodium nitrate.

12. A process according to claim 1 wherein said first and second coatings are applied on a continuous basis with drying being conducted immediately following contact with the dispersions of (b) and (c).

13. A process for forming a pre-glued glass fabric wallcovering comprising:
   (a) providing a glass fabric,
   (b) forming first dried coatings on both sides of said glass fabric that are applied from an aqueous dispersion comprising starch, polymeric latex binder, cross-linking agent, and pigment, and
   (c) next forming a second dried coating in the absence of a latex binder on said first dried coating on one side only of said glass fabric that is applied from an aqueous dispersion comprising starch and an inorganic compound that serves to enhance the water absorbability of said dried coating with said second dried coating serving as an adhesive for the attachment of the resulting wallcovering to a wall following application of water.

14. A process according to claim 13 wherein said glass fabric is woven fabric.

15. A process according to claim 13 wherein said glass fabric is a nonwoven fabric.

16. A process according to claim 13 wherein said starch component of (b) is potato starch.

17. A process according to claim 13 wherein said polymeric latex binder component of (b) is an acrylic latex binder.

18. A process according to claim 13 wherein said aqueous dispersion of (b) wherein said pigment includes titanium dioxide.

19. A process according to claim 13 wherein said starch component of (c) is a mixture of potato starch and corn starch.

20. A process according to claim 13 wherein said inorganic compound of (c) is sodium nitrate.

21. A process according to claim 13 wherein said first and second coatings are applied on a continuous basis with drying being conducted immediately following contact with the aqueous dispersions of (b) and (c).

22. A wallcovering formed by the process of claim 1 which can be attached to a wall following the application of water by spraying to said second dried coating.

23. A wallcovering formed by the process of claim 13 which can be attached to a wall following the application of water by spraying to said second dried coating.

* * * * *